UNITED STATES PATENT OFFICE.

FRANCIS ELLERSHAUSEN, OF HEBBURN-ON-TYNE, ASSIGNOR TO THE SODA IMPROVEMENTS COMPANY, LIMITED, OF LONDON, ENGLAND.

PROCESS OF MAKING CAUSTIC ALKALI.

SPECIFICATION forming part of Letters Patent No. 458,563, dated September 1, 1891.

Application filed November 4, 1890. Serial No. 370,292. (No specimens.)

*To all whom it may concern:*

Be it known that I, FRANCIS ELLERSHAUSEN, a subject of the Queen of Great Britain, residing at Hebburn-on-Tyne, Durham, England, have invented new and useful Improvements in the Manufacture of Soda and Potash; and I do hereby declare that the following is a full, clear, and exact description of the invention, which will enable others skilled in the art to which it appertains to make and use the same.

My invention chiefly relates to the manufacture of caustic soda from sulphide of sodium by means of ferrate of soda, sometimes called "ferrite of soda," and hereinafter referred to as "ferrate." It is known that if ferrate of soda be lixiviated with water a solution of caustic soda is obtained and hydroxide of iron is deposited. It is also known that if a solution of sulphide of sodium be treated with hydroxide of iron (either in the natural state or produced as above described or in any other suitable manner) the said solution is causticized and sulphide of iron is formed. The equation which represents this reaction is probably as follows:

$$Fe_2(HO)_6 + 4Na_2S = Fe_2Na_2S_4 + 6NaOH.$$

The chief drawbacks to the use of hydroxide of iron are its moist nature and its finely-divided condition, which cause it, when in contact with the solution treated, to assume a muddy form, through which it is impossible for the liquid to percolate, so that there is very little contact between the solution and the hydroxide, and consequently an imperfect reaction. If in order to obviate this imperfect reaction the sulphide-of-sodium solution is agitated after the introduction of the hydroxide of iron, it is found that a large proportion of the soda goes with the sulphide of iron unless the solution is diluted to such an extent as to render the cost of concentration a bar to the commercial working of the process, and in addition to this the quantity of free water given off by the hydroxide of iron during the reaction tends still further to reduce the strength of the caustic solution. For these and other reasons such a process has not been commercially successful, although many attempts have been made to use it.

The chief object of my invention is to obviate the defects heretofore experienced in the direct use of hydroxide of iron in the manufacture of caustic soda from sulphide of sodium; and to this end I treat the sulphide of sodium with ferrate directly. I believe that the reaction which occurs may be expressed as follows:

$$Fe_2O_3Na_2O + 4H_2O + 4Na_2S = Fe_2Na_2S_4 + 8NaOH.$$

The mode in which I prefer to conduct the process is as follows: I roast carbonate of soda and peroxide of iron and obtain the ferrate in a granular form. The use of ferrate in the granular condition gives the best results. I form a filter-bed of the ferrate, which may be of considerable thickness—say about four feet deep—into which the solution of sodium sulphide of a strength of, say, 40° Twaddle, is poured, and through which, owing to the granular form of the ferrate, it can freely percolate. In the course of this percolation nearly all the soda in the ferrate and the sodium in the sulphide solution are converted into a solution of caustic soda, while another portion of the soda forms with the iron a double compound, videlicet, sulphuret of iron and sodium, which is insoluble. The strength of the said solution is considerably increased by the presence of the soda originally contained in the ferrate. By reason of the fact that ferrate is anhydrous, and in its conversion into caustic soda absorbs a considerable quantity of water from the solution, the concentration of the solution is considerably increased.

In practice the ferrate forming the filter-bed is advantageously placed in a metal tank, and in order to prevent the latter from being injured by the contact of the sulphide of sodium therewith the sulphide-of-sodium solution is introduced into the bed at about its center, or in such other position that it has to flow through or over sufficient ferrate of soda to convert the soda into caustic soda before it reaches the walls of the tank. When the filter-bed is exhausted, the double sulphuret of iron and sodium may be treated for the production of either sulphate or sulphite or hyposulphite of soda; but this treatment forms no part of the present process, as it will constitute the subject of a separate application for a patent.

In the foregoing description I have referred to the manufacture of caustic soda, and my invention is equally applicable for the manufacture of caustic potash, carbonate of potash being used instead of carbonate of soda in the preparation of the ferrate.

Having now particularly described and ascertained the nature of my said invention and in what manner the same is to be performed, I declare that what I claim is—

The improvement in the art of manufacturing caustic soda and potash from solutions of their respective sulphides, which consists in passing such solutions through a filter-bed composed of granulated ferrate of sodium or potassium, substantially as described.

FRANCIS ELLERSHAUSEN.

Witnesses:
G. T. REDFERN,
F. W. PRICE.